(12) United States Patent
Gayles et al.

(10) Patent No.: US 9,154,534 B1
(45) Date of Patent: Oct. 6, 2015

(54) MULTIPLE MEDIA DEVICE INFRASTRUCTURE

(71) Applicant: Amazon Technologies, Inc., Reno, NV (US)

(72) Inventors: Edward James Gayles, Tracy, CA (US); Varadarajan Gopalakrishnan, Cupertino, CA (US); Shih-Chun Chang, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 274 days.

(21) Appl. No.: 13/732,873

(22) Filed: Jan. 2, 2013

(51) Int. Cl.
| | | |
|---|---|---|
| *G06F 15/16* | (2006.01) | |
| *H04L 29/06* | (2006.01) | |
| *H04W 12/06* | (2009.01) | |
| *H04W 76/02* | (2009.01) | |
| *H04W 8/00* | (2009.01) | |
| *H04W 4/20* | (2009.01) | |
| *H04L 29/08* | (2006.01) | |

(52) U.S. Cl.
CPC ............. *H04L 65/60* (2013.01); *H04L 65/4076* (2013.01); *H04L 65/4084* (2013.01); *H04L 67/16* (2013.01); *H04W 4/206* (2013.01); *H04W 8/005* (2013.01); *H04W 12/06* (2013.01); *H04W 76/02* (2013.01)

(58) Field of Classification Search
CPC . H04L 65/4084; H04L 65/4076; H04L 67/16; H04W 8/005; H04W 4/206; H04W 76/02; H04W 12/06
USPC .......................... 709/200–203, 217–227, 228
See application file for complete search history.

(56) References Cited

U.S. PATENT DOCUMENTS

| | | | | |
|---|---|---|---|---|
| 7,170,857 | B2 * | 1/2007 | Stephens et al. .............. | 370/230 |
| 7,215,923 | B2 * | 5/2007 | Hillyard ....................... | 455/41.1 |
| 7,656,847 | B2 * | 2/2010 | Mela et al. .................... | 370/338 |
| 8,270,415 | B2 * | 9/2012 | Niranjan et al. .............. | 370/400 |
| 8,594,632 | B1 * | 11/2013 | Azizi et al. .................... | 455/411 |
| 2003/0027526 | A1 * | 2/2003 | Hillyard ......................... | 455/41 |
| 2005/0058109 | A1 * | 3/2005 | Ekberg .......................... | 370/338 |
| 2009/0034591 | A1 * | 2/2009 | Julian et al. ................... | 375/220 |
| 2013/0185447 | A1 * | 7/2013 | Nagawade et al. ........... | 709/228 |
| 2014/0040364 | A1 * | 2/2014 | Baldwin et al. ............... | 709/204 |
| 2014/0040493 | A1 * | 2/2014 | Baldwin ....................... | 709/231 |
| 2014/0045422 | A1 * | 2/2014 | Qi et al. ......................... | 455/39 |
| 2014/0122656 | A1 * | 5/2014 | Baldwin et al. ............... | 709/219 |

* cited by examiner

*Primary Examiner* — Moustafa M Meky
(74) *Attorney, Agent, or Firm* — Lindauer Law, PLLC

(57) ABSTRACT

Described herein are systems and methods for automatically discovering services available between two or more media devices. These services may be configured to provide content for presentation, present content, and so forth. Once discovered, connections may be established between the media devices. These connections may be used to control or deliver content using the services. The discovery, establishment of the connections, or both may occur automatically without user intervention.

20 Claims, 10 Drawing Sheets

| ROUTE MAP 228 |||||
|---|---|---|---|---|
| DEVICE IDENTIFIER 402 | DEVICE TYPE 404 | SERVICES SUPPORTED 406 | ADDRESS(ES) 408 | DESIGNATED TRANSPORT MODULE 410 |
| 104(1) | Source/ Sink | Audio, Video, Still Image, Haptic | 10.0.0.51, 546965726e616e, ... | WFD, IP... |
| 104(2) | Source | Audio, Still Image | 616d6172697365 | WFD, ZigBee, IP |
| 104(3) | Source/ Sink | Audio, Still Image | 10.0.0.75 | IP |
| 104(4) | Source | Audio, Video | 2001:db8:85a3::8a2e:370:7334 | IP, Bluetooth |
| 104(5) | Sink | Audio | 001060AA36F8 | Bluetooth |
| 104(6) | Sink | Audio, Video, Still Image | 10.0.0.17, 2002:db8:84a3::8a2e:370:7335 | WFD, IP, ZigBee |

FIG. 4

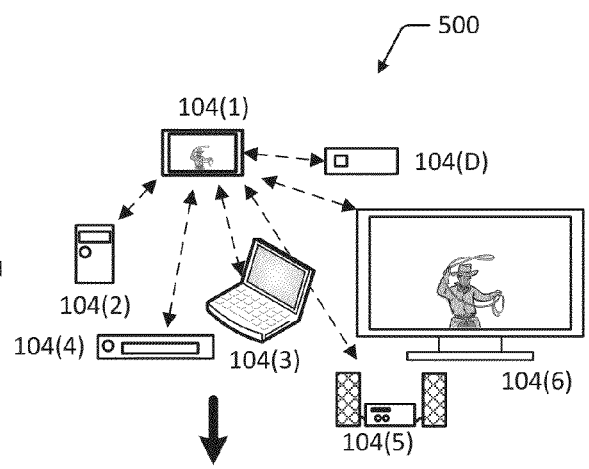

502 ACQUIRE DATA DESCRIPTIVE OF ONE OR MORE MEDIA DEVICES AVAILABLE FOR COMMUNICATION

504 BUILD A ROUTE MAP DESCRIPTIVE OF SERVICES AVAILABLE FROM THE MEDIA DEVICES

| Device | Type | Services Supported |
|---|---|---|
| 104(1) | Both | Audio, Video, Still Image, Haptic |
| 104(2) | Source | Audio, Still Image |
| 104(3) | Both | Audio, Video, Still Image |
| 104(4) | Source | Audio, Video |
| 104(5) | Sink | Audio |
| 104(6) | Sink | Audio, Video, Still Image |

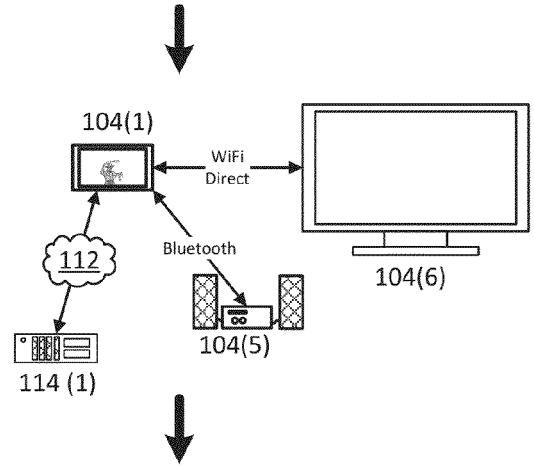

506 ESTABLISH A CONNECTION WITH THE ONE OR MORE AVAILABLE MEDIA DEVICES

508 PRESENT CONTENT ON THE ONE OR MORE CONNECTED MEDIA DEVICES

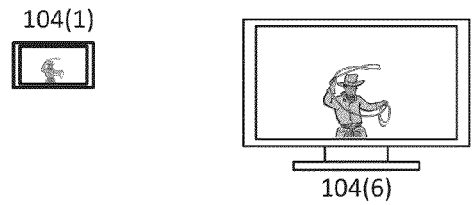

FIG. 5

MULTIPLE MEDIA DEVICE INFRASTRUCTURE

BACKGROUND

A wide variety of media devices are available for consumers to use for the consumption of an ever growing selection of content. These media devices may include televisions, tablet computers, personal computers, electronic book readers, gaming consoles, set-top boxes, media players, in-vehicle entertainment systems, portable media players, smartphones, and so forth. The content presented by these media devices may include audio, video, electronic books, games, and so forth. The content may be downloaded or streamed from a content provider to the media device.

Users may add or remove different media devices into an environment over time. For example, users may enter a living room with a smartphone or tablet computer, add a Blu-ray or other media player to a home entertainment system, and so forth. Traditional mechanisms for adding or removing media devices to allow for interaction between the media devices may result in an adverse user experience.

BRIEF DESCRIPTION OF DRAWINGS

FIG. 4 illustrates a schematic of a route map which may be used by the communication module to establish communications between the media devices of the system.

FIG. 5 illustrates a scenario of discovering and connecting media devices using the multiple media device system.

Figure 1:
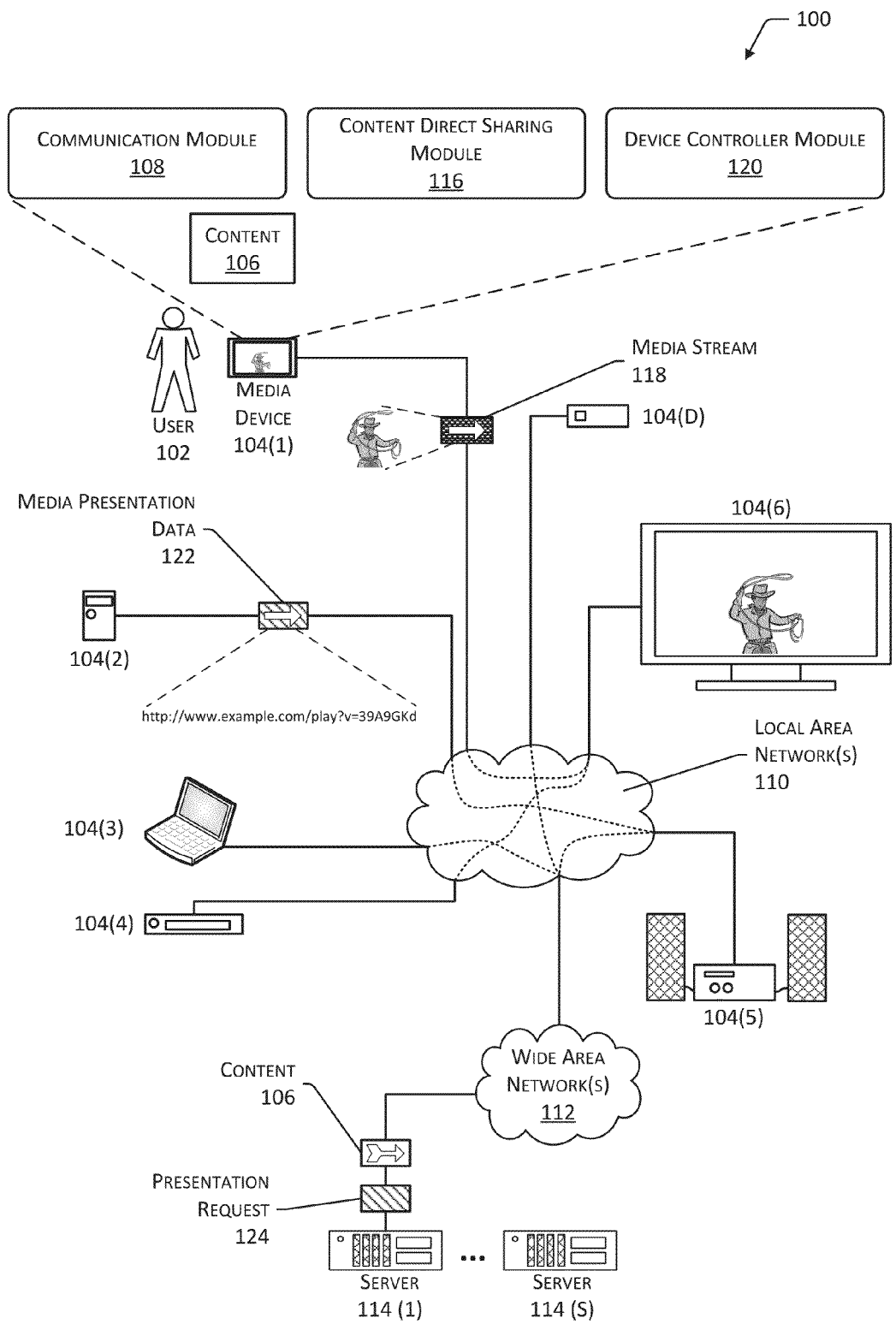
FIG. 1 is an illustrative system of a multiple media device system in which various services of the media devices may be discovered and shared.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Content may be consumed, processed, distributed, and so forth by groups of two or more media devices. These media devices may include televisions, tablet computers, personal computers, electronic book readers, gaming consoles, set-top boxes, media players, in-vehicle entertainment systems, portable media players, tablet computers, smartphones, and so forth. The content may include audio, video, electronic books, games, and so forth. The content may be downloaded or streamed from a content provider for consumption, processing, storage, and so forth on a media device.

A system for the presentation of the content may be made up of more than one media device. For example, the presentation may involve a tablet computer providing an interactive user interface using a touch screen and display while a television provides imagery and an audio video receiver ("AVR") provides sound output.

Traditionally user intervention has been called for when adding or removing media devices from the system. However, this user intervention may result in an adverse user experience by requiring a series of user actions to establish communication between the media devices.

Described in this disclosure are methods and systems for providing discovery of media devices by one another, and the services supported by those media devices. Once discovered, connections may be established between media devices, allowing for the distribution, presentation, control, and so forth of the content among the media devices.

Each media device may include a communication module. The communication module is configured to discover other media devices and the services they support and provide a framework for establishing and using connections with the other media devices. The connections may be authenticated, encrypted, and so forth.

The communication module may be configured to operate in conjunction with a content direct sharing module which sends a media stream to a receiving media device. For example, the content direct sharing module uses connections maintained by the communication module to send audio and video data from a tablet computer to a television for presentation.

The connections maintained by the communication module may be used to send media presentation data to a receiving media device. The receiving media device uses the media presentation data to retrieve the content for presentation from another location such as a server on a local area network ("LAN") or a wide area network ("WAN"). The media presentation data may include an address and content identifier, which when processed by the receiving media device, initiates a transfer from a server to the receiving media device.

The connection module may be implemented as a software stack executing on the media devices in the system. The connection module on a first media device may differ from the connection module on a second media device. For example, the first media device may include a transport module configured to provide secure sockets over Internet Protocol while the second media device may not. The media devices may include the content direct sharing module, the device controller module, or both.

By providing the communication module, the content direct sharing module, and the device controller module on media devices, the system enhances the user experience. Media devices entering the environment with their associated services may be readily added or removed, and content may be easily shared among those media devices.

Illustrative System

FIG. 1 is an illustrative system 100 for providing a multiple media device infrastructure in which various services of the media devices may be discovered and shared. As used in this disclosure, services are modules or groups of instructions which, when executed by a processor, provide a particular set of functionalities. For example, a video streaming service may be configured to participate in a streaming session with a content provider and output video suitable for presentation on a display.

A user 102 is depicted with several media devices 104(1), 104(2), ..., 104(D). While a single user 102 is shown, more than one user 102 may be present. The media devices 104 are configured to present, store, manipulate, or otherwise participate in the consumption of content 106. The media devices 104 may include televisions, tablet computers, personal computers, electronic book readers, gaming consoles, set-top boxes, media players, in-vehicle entertainment systems, portable media players, smartphones, and so forth.

The media devices 104 may execute on one or more services. These services may be configured to interact with the content 106 by receiving and processing the content 106 for presentation, generating a stream of content for presentation, providing various functionality, and so forth. The media devices 104 are discussed below in more detail with regard to FIG. 2. The content 106 may include audio, video, electronic books, games, and so forth.

The media devices 104 include a communication module 108. The communication module 108 is configured to support a framework within which availability of different services on different media devices 104 may be distributed and connections between those media devices 104 may be established. These connections may be used to send, receive, control, or otherwise interact with the content 106. The communication module 108 is discussed in more detail below with regard to FIG. 3.

These connections maintained by the communication module 108 may use one or more local area networks ("LANs") 110. The LANs 110 may be supported using an access point topology, ad-hoc peer-to-peer topology, and so forth. The LANs may be wired, wireless, or a combination. The LANs 110 may be implemented using Ethernet, Wi-Fi™, Bluetooth®, ZigBee®, and so forth. Within the system 100, several different LANs 110 may coexist. For example, media device 104(1) and 104(6) may be connected to one another using Wi-Fi™, while the media device 104(2) and 104(5) may be interconnected using Bluetooth®. The connections may be between media devices 104 which are on the same or different local area networks 110.

The LAN(s) 110 may connect to one or more wide area networks ("WANs") 112. The WAN 112 may include one or more public networks such as the Internet, private networks, cellular data networks, or a combination thereof. The WAN 112 may in turn couple to one or more servers 114(1), 114(2), ..., 114(S). The servers 114 may exchange information with the one or more media devices 104. While the servers 114 are depicted as single servers, in some implementations the servers 114 or the functions attributed to the servers 114 may be provided by a plurality of devices. For example, the server 114 may be implemented as a virtualized server executing across a plurality of physical servers.

In one implementation the server 114 or another device coupled to the WAN 112 may provide a proxy service to transfer information from a media device 104(1) to another media device 104(2) using the WAN 112. These media devices 104 may be on the same or different LANs 110. In another implementation the media devices 104 on different LANs 110 may establish connections with one another over the WAN 112 without using the proxy service.

The media device 104 may include other modules such as a content direct sharing module 116. The content direct sharing module 116 provides a media stream 118 from a first media device 104 to a second media device 104. For example, as illustrated here a tablet computer media device 104(1) may be configured to receive content 106 which is protected using one or more digital rights management ("DRM") schemes, while the television media device 104(6) is not so configured.

A content direct sharing module 116 executes on both the tablet media device 104(1) and the television media device 104(6). The content direct sharing module 116(1) of the media device 104(1) generates a media stream 118 which is sent, using the LAN 110, to the media device 104(6) which presents at least a portion of the media stream 118. The media stream 118 may be transcoded from the content 106 on the source media device 104. For example, where the content 106 as available on the media device 104(1) is incompatible with the receiving media device 104(6), the media stream 118 may comprise a transcoded version of the content 106 which is compatible with the receiving media device 104(6). In implementations where the media stream 118 is compatible, transcoding may be omitted. Continuing the example, in this way the media device 104(6) which is otherwise unequipped to directly retrieve and present the DRM-protected content 106 may be used as a larger display for the media device 104(1) to improve the user's 102 experience of the content 106.

The content direct sharing module 116 may be configured to maintain DRM protections, or provide replacement DRM protections. In some implementations the content direct sharing module 116 which is receiving the media stream 118 may be disallowed from storing the media stream in permanent or semi-permanent memory. For example, the content direct sharing module 116 may be configured to store no more than 300 frames of media stream 118 data at any given time. The content direct sharing module 116 may also be configured to establish a secured pathway to the display of the media device 104 executing the content direct sharing module 116, to minimize or eliminate interception of the media stream 118 by other applications or services executing on the media device 104.

The content direct sharing module 116 may include modules such as a virtual screen module, a virtual audio device module, or both. The virtual screen module may be configured to acquire video data which is designated for presentation on the display of the media device 104. The virtual screen module may also be configured to receive video data, such as the media stream 118 from another media device 104 and present that video data on the display of the media device 104. This communication may be facilitated by the communication module 108. The virtual audio device module may be configured to acquire audio data which is designated for presentation on speakers of the media device 104. Likewise, the virtual audio device module may be configured to receive audio data, such as from the media stream 118 and present that audio data on the speakers of the media device 104.

The content direct sharing module 116 may be configured to send media streams 118 to multiple media devices 104, either as a multicast or as separate streams. For example, the media device 104(1) may provide the media stream 118 to the media devices 104(5) and 104(6) for presentation using a multicast. In another example, the media device 104(1) may provide a first media stream 118(1) to the media device 104(5) and a second media stream 118(2) to the media device 104(6).

The content direct sharing module 116 may be configured to mirror presentation of content 106, or provide different information to different media devices 104. In one implementation first content 106 may be presented on the media device 104 providing content direct sharing while different second content is sent to another media device 104. Continuing the example, the media device 104(1) may present a user interface for controlling presentation of the content 106, while a media stream 118(1) comprising video is sent to the media device 104(6) for presentation on a display and a media stream 118(2) comprising audio is sent to the media device 104(5) for presentation by the speakers.

The media device 104 may also include a device controller module 120. The device controller module 120 is configured to generate media presentation data 122. The media presentation data 122 provides information indicative of one or more pieces of content 106 to be presented. For example, in this illustration the media presentation data 122 includes the uniform resource locator ("URL") of "http://www.example.com/play?v=39A9GKd". A first media device 104 may generate and send the media presentation data 122 to a second media device 104. The second media device 104 may then use the media presentation data 122 to generate a presentation request 124. The presentation request 124 may be sent to a content provider, such as executing on the server 114. The server 114, based at least in part on the presentation request 124, may provide content 106. Continuing the example, the content 106 with the identifier of "39A9GKd" available from the domain example.com may be presented. The content 106 may be delivered as a download or stream.

Figure 2:
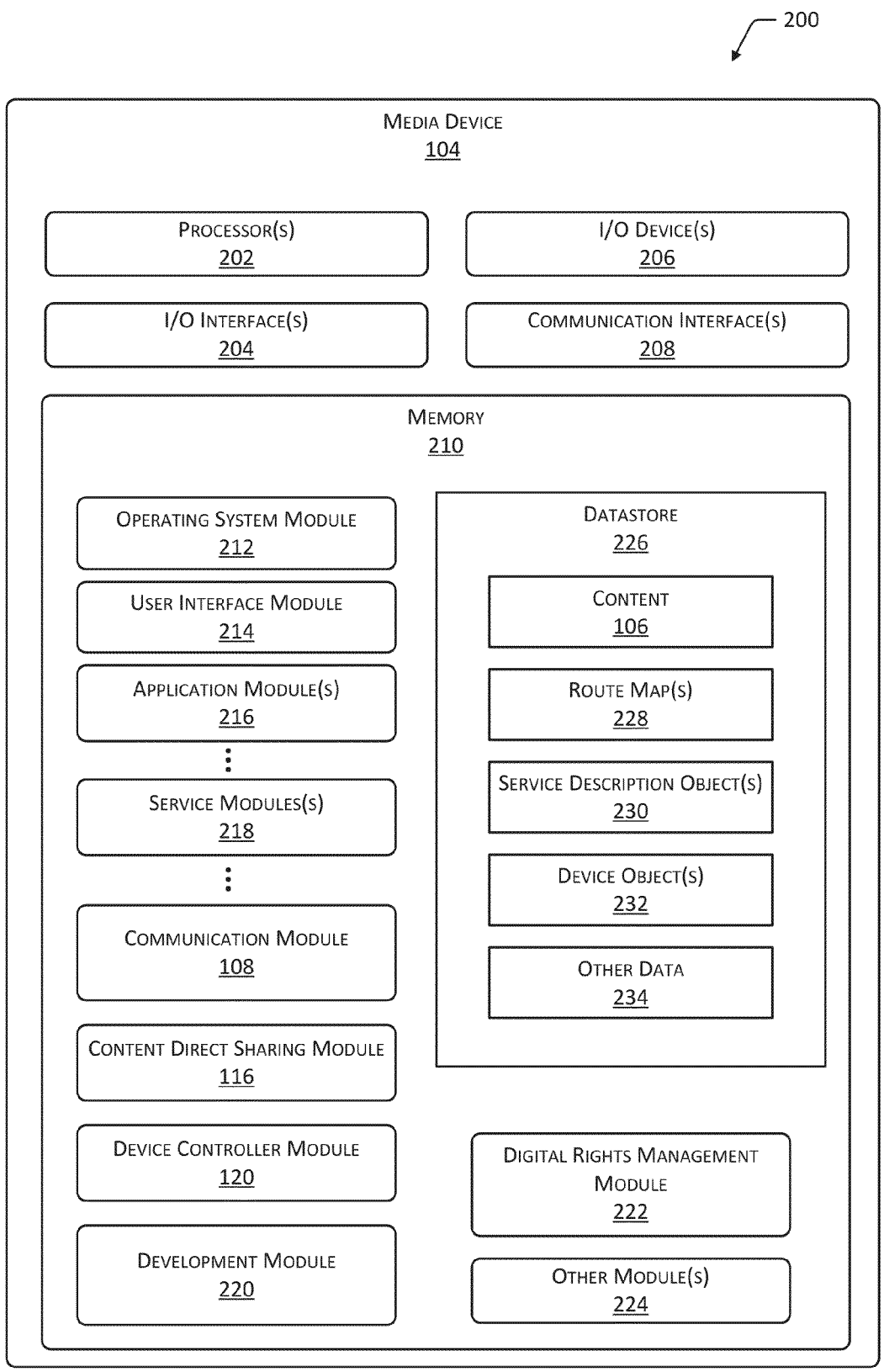
FIG. 2 illustrates a block diagram of a media device configured to support the multiple media device system.

FIG. 2 illustrates a block diagram 200 of the media device 104 configured to support the multiple media device infrastructure. The media device 104 may include one or more processors 202 configured to execute one or more stored instructions. The processors 202 may comprise one or more cores. The media device 104 may include one or more input/output ("I/O") interface(s) 204 to allow the processor 202 or other portions of the media device 104 to communicate with other devices. The I/O interfaces 204 may comprise inter-integrated circuit ("I2C"), serial peripheral interface bus ("SPI"), Universal Serial Bus ("USB") as promulgated by the USB Implementers Forum, RS-232, one or more media device interfaces such as High Definition Multimedia Interface ("HDMI") as promulgated by HDMI Licensing LLC, TOSLINK® as promulgated by Toshiba Corp., analog video, analog audio, IEEE 1394 as promulgated by the Institute for Electrical and Electronics Engineers, and so forth.

The I/O interface(s) 204 may couple to one or more I/O devices 206. The I/O devices 206 may include input devices such as one or more of a camera, a microphone, a touch sensor, a button, and so forth. The I/O devices 206 may also include output devices such as one or more of a display, audio speakers, haptic output device and so forth. In some embodiments, the I/O devices 206 may be physically incorporated with the media device 104 or may be externally placed.

The media device 104 may also include one or more communication interfaces 208. The communication interfaces 208 are configured to provide communications between the media device 104 and other devices, such as other media devices 104, routers, access points, the servers 114, and so forth. The communication interfaces 208 may include personal area networks, wired and wireless local area networks 110, wide area networks 112, and so forth. For example, Ethernet, Wi-Fi™, Bluetooth®, ZigBee®, and so forth.

The media device 104 may also include one or more busses or other internal communications hardware or software that allow for the transfer of data between the various modules and components of the media device 104.

As shown in FIG. 2, the media device 104 includes one or more memories 210. The memory 210 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 210 provides storage of computer readable instructions, data structures, program modules and other data for the operation of the media device 104.

The memory 210 may include at least one operating system (OS) module 212. The OS module 212 is configured to manage hardware resource devices such as the I/O interfaces 204, the I/O devices 206, the communication interfaces 208, and provide various services to applications or modules executing on the processors 202. Also stored in the memory 210 may be one or more of the following modules. These modules may be executed as foreground applications, background tasks, daemons, and so forth.

A user interface module 214 is configured to provide a user interface to the user 102 using the I/O devices 206 and accept inputs received from the I/O devices 206. The user interface may include one or more visual, audible, or haptic elements. For example, the user interface may be configured to provide a graphic user interface, an audible user interface, and so forth.

One or more application modules 216 may be stored in the memory 210. The one or more application modules 216 provide functionality which interacts with the user 102. For example, an application module 216 may be a game which is playable by the user.

One or more service modules 218 may be stored in the memory 210. The service modules 218 provide one or more services comprising one or more data processing functionalities to other service modules 218, application modules 216, or other modules. The one or more functionalities may be associated with presentation of the content 106 on one of the media devices 104. For example, the service modules 218 may be configured to stream audio or video from a server for presentation, transfer and present images, transfer files, and so forth. Other service modules 218 may provide functionality such as authentication to confirm information such as the ownership or affiliation of a particular media device 104.

As described above, the communication module 108 is configured to establish and support communications between the media device 104, other media devices 104, the servers 114, and other devices. The communication module 108 may provide an abstraction to allow the application modules 216, service modules 218, and so forth to readily interact with corresponding modules on other media devices 104. The communication module 108 may access the communication interfaces 208 to exchange information between the devices. The communication module 108 is discussed in more detail below with regard to FIG. 3.

As described above, the content direct sharing module 116 provides a media stream 118 from a first media device 104 to a second media device 104. In one implementation the content direct sharing module 116 may provide for concurrent presentation between the first media device 104 and the second or more media devices 104. In another implementation, the content direct sharing module 116 may suppress or discontinue presentation on the first media device 104 while presentation continues on the second or more media devices 104. For example, a media presentation application module 216 on the tablet media device 104(1) may be receiving a stream of the DRM protected movie "Burnt Sage." The content direct sharing module 116 may request from the communication module 108 connections to the pair of television media device 104(6) and 104(7). The communication module 108 may establish these connections and presentation may appear simultaneously on the television media devices 104(6) and 104(7), while a user interface allowing for control of the media presentation application module 216 may remain on the tablet media device 104(1) to facilitate the user's 102 control of the presentation.

As also described above, the device controller module 120 allows for the presentation of content 106 on another media device 104. In contrast to the content direct sharing module 116 which provides the media stream 118, the device controller module 120 initiates presentation on the other media device 104. The device controller module 120 generates the media presentation data 122 which provides information indicative of one or more pieces of content 106 to be presented. The media presentation data 122 may include one or more URLs, uniform resource identifiers ("URIs"), identification numbers, serial numbers, database access key values, and so forth.

A service module 218 on one or more receiving media devices 104(5) is configured to process this media presentation data 122 and begin presentation of the one or more pieces of content 106 indicated in the media presentation data 122. Continuing the example above, the receiving media device 104(5) may then begin presentation of the content 106 located at "http://www.example.com/play?v=39A9GKd". The presentation of the content 106 on the receiving media device 104(5) may involve sending the presentation request 124 to the server 114 of a content provider. The server 114 may respond to this presentation request 124 by streaming the content 106 to the receiving media device 104(5). In this case, the particular content with the identification code "39A9GKd."

A development module 220 may be stored in the memory 210 of the media device 104. The development module 220 may include various libraries, modules, functions, and so forth such as may be present in a software development kit. The development module 220 may implement functions such as "default service implementation" in which an initial set of basic service housekeeping issues are defined. The development module 220 may also implement a "transport manager" configured to select and manage particular transport modules for use based on parameters such as access level associated with the service, what transport module the service was discovered over, and so forth. The transport modules are discussed in more detail below with regard to FIG. 3.

A digital rights management module 222 may provide support for presenting or processing content 106 which is protected using one or more digital rights management schemes. Other modules 224 may also be present. For example, a speech recognition module may be present and used to accept spoken input from the user 102 as received from a microphone I/O device 206.

The memory 210 may also include a datastore 226 to store information. The datastore 226 may use a flat file, database, linked list, tree, or other data structure to store the information. In some implementations, the datastore 226 or a portion of the datastore 226 may be distributed across one or more other devices including servers, network-attached storage devices, and so forth.

The datastore 226 may store content 106, either in its entirety or a portion. One or more route maps 228 may be stored. The route maps 228 provide information about services on other media devices 104 and the routing to access those services. The route map is discussed in more detail below with regard to FIG. 4.

Service description objects ("SDO") 230 may be stored. The SDO 230 provides information such as service identifiers, access information, encryption information, and so forth, associated with a particular service as provided by a service module 218. The service identifiers may be used to indicate a particular service which is available. The access information may include details on account names, passwords, supported transports, and so forth. The encryption information may include data such as encryption keys, protocols, and so forth.

Device objects ("DOs") 232 may also be stored in the memory 210. These may include a service description array indicating available services local to a particular media device 104, universally unique identifier ("UUID") associated with the particular media device 104, friendly name for the particular media device 104, transport information, and so forth. Transport modules and the associated information are discussed below with regard to FIG. 3.

Other data 234 may also be stored. For example, the other data 234 may include user preferences, configuration files, and so forth.

Figure 3:
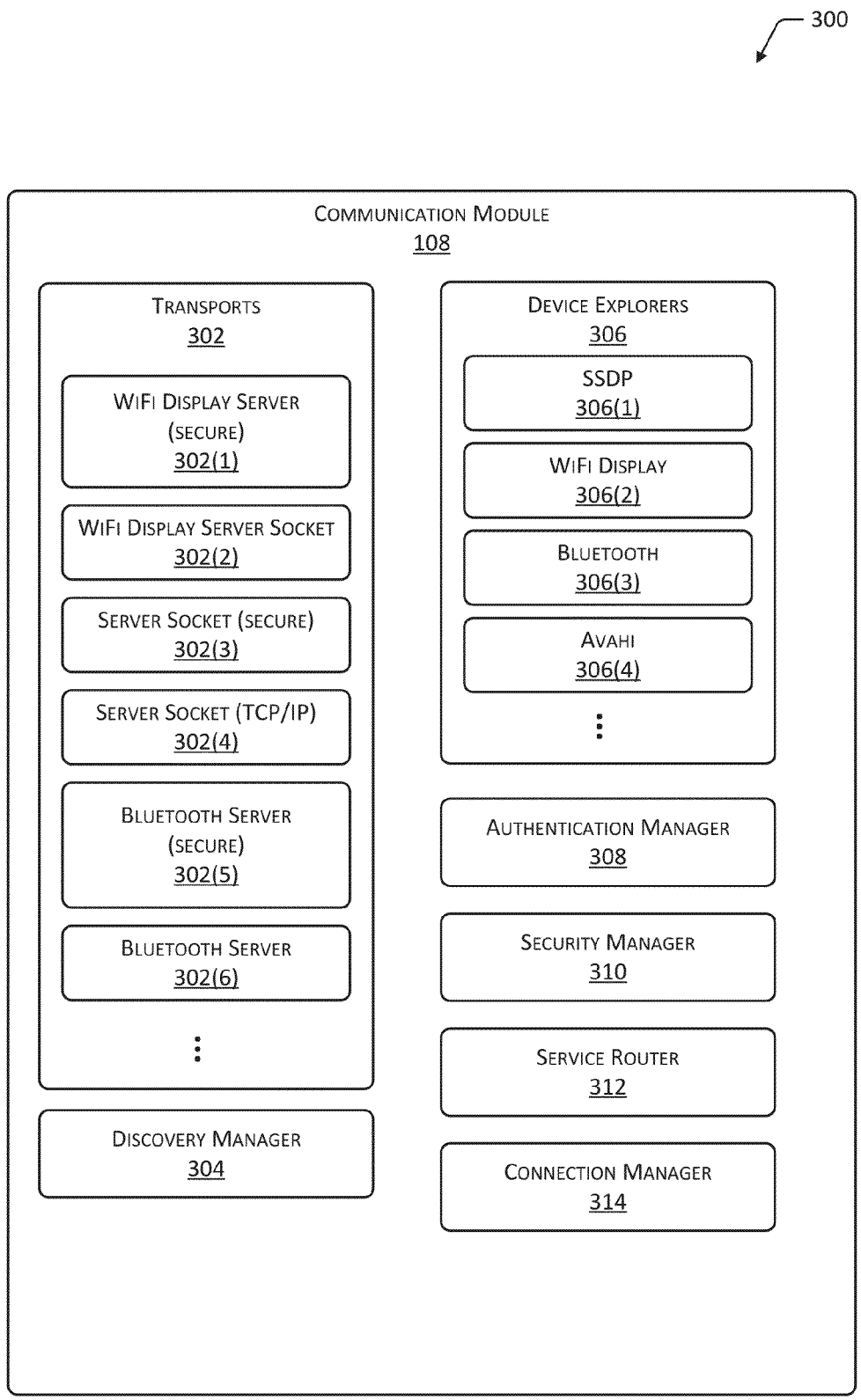
FIG. 3 illustrates a block diagram of a communication module configured to support the multiple media device system.

FIG. 3 illustrates a block diagram 300 of the communication module 108 configured to support the multiple media device infrastructure. In some implementations, the communication module 108 and the subordinate modules may be implemented as a daemon. The communication module 108 may include modules including one or more transport modules 302, a discovery manager 304, one or more device explorers 306, an authentication manager 308, a security manager 310, a service router 312, a connection manager 314, and so forth.

The transport modules 302 are configured to provide functionality at a transport layer and establish and maintain communication channels that transfer bits from one media device 104 to another device. In one implementation the transport modules 302 may operate at layer 4 of the Open Systems Interconnection ("OSI") model. The media device 104 may have multiple transport modules 302 available contemporaneously.

The communication module 108 provides a simplified abstraction to the application modules 216, service modules 218, and other modules. A module requiring communication services may use this simplified abstraction to readily initiate communication without the module knowing the details of the particular transport module and type of connection involved. For example, a requesting service module 218(1) on the media device 104(1) may initiate a request to communicate with the corresponding service module 218(2) on the media device 104(5). This communication may use one or more of several different transport modules 302, but this complexity is hidden from the requesting service module 218(1) and from the receiving service module 218(2).

Due to the modular nature of the communication module 108, additional transport modules 302 may be easily added without requiring re-engineering of the communication module 108. For example, a transport module 302 supporting an infrared optical transport mechanism may be added without disrupting other existing transport modules 302 or other operational aspects of the communication module 108.

The transport modules 302 may include a secured Wi-Fi™ Display server 302(1) and an unsecured Wi-Fi™ Display server 302(2). These transport modules 302(1)-(2) may be compliant with the Miracast standard promulgated by the Wi-Fi™ Alliance, the Intel Wireless Display ("WiDi") standard developed by Intel Corporation, or both. The Wi-Fi™ Display transport module allows for peer-to-peer exchange of media information. This exchange may be encrypted in the case of the secured transport, or unencrypted in the case of the unsecured transport.

Transport modules 302 which are based on Internet Protocol ("IP") server sockets may be provided, such as a secure server socket 302(3) and an unsecured server socket 302(4). These transport modules 302(3)-(4) may support wired or wireless communication.

Transport modules 302 may also support the Bluetooth® standard as promulgated by the Bluetooth Special Interest Group. A Bluetooth® server which is secured 302(5) may be provided, as well as a Bluetooth® server 302(6) which is unsecured.

Other transport modules 302 may also be provided. For example, a transport module may provide transport functionality over a wireless WAN, such as LTE, 3G, 4G, and so forth. The transport modules 302 may implement a portion of the standard, specification, or protocol. For example, the transport modules associated with Bluetooth® may omit application level functions in the Bluetooth® specification, such as profiles.

A discovery manager 304 manages the device explorers 306. The discovery manager 304 provides an interface which abstracts the mechanism provided by the device explorers 306 to search for media devices 104 and discover the services associated with those media devices. The discovery manager 304 provides to other modules the results of the discovery, while concealing from other modules consuming these results the complexity of the search and discovery processes which may differ from transport module 302 to transport module 302.

The device explorers 306 are modules which are configured to gather device object 232 data using one or more of the transport modules 302. The device explorers 306 may process the device objects 232 to generate one or more route maps 228. The device explorers 306 may also be configured to respond to the device explorers 306 on other devices to distribute device objects 232, route maps 228, or other information.

The device explorers 306 may operate in "active" or "passive" modes. The active mode requires some interaction, such as user 102 approval, before a service is advertised as being available. The active mode may be time limited, such that the associated service is only discoverable for a particular period, so long as the user 102 is activating a particular command or button, and so forth. For example, the service module 218 providing output for the tablet media device 104(1) may be placed in active mode, such that the display and speakers of that media device 104(1) are only discoverable when the user 102 explicitly makes them so.

In comparison, the device explorers 306 may operate in a passive mode. In the passive mode, the service modules 218 are available without user interaction. For example, the AVR media device 104(5) and the television media device 104(6) may be configured to operate in passive mode such that any of the media devices 104 in the system 100 may see the resources they have available to share.

Depicted here are device explorers 306 including for simple service discovery protocol ("SSDP") 306(1), Wi-Fi™ Display 306(2), Bluetooth® 306(3), Avahi 306(4), and so forth. The SSDP 306(1) allows for advertisement and discovery of services over an IP-based network using user datagram protocol ("UDP") packets for transfer using one or more of the transport modules 302. The Avahi explorer 306(4) may implement a version of Avahi as developed by Lennart Poettering and others. Avahi provides a zero configuration protocol using at least a portion of the multicast domain name service ("DNS"), DNS-based service discovery ("DNS-SD"), or both to discover and configure an IP-based network without user intervention.

The authentication manager 308 is configured to authenticate the media devices 104 in the system 100 and authorize communications with one or more of those media devices 104. This authentication may be accomplished within the LAN 110, or may involve external resources such as the servers 114. In one implementation, the authentication may involve parsing a device identifier received from another media device 104 to determine a manufacturer or model number. Previously determined devices 104 may then be allowed to communicate. In another implementation, a first media device 104 may interrogate the server 114 to authenticate a second media device 104. For example, the tablet media device 104(1) may discover the presence of the television media device 104(6). Continuing the example, the tablet media device 104(1) may send data about the television media device 104(6) to the server 114, to confirm that connectivity is permitted. The authentication manager 308 may manage this exchange.

In some implementations the authentication manager 308, or another module, may be configured to authenticate the identity of the user 102. In one implementation, access levels to services available on the LAN 110 may be based at least in part on user identity. For example, the user 102(1) who lives in a home environment where the system 100 is implemented may have "family" access when using the device of another user 102(1) in that environment.

A security manager 310 is configured to manage use of encryption and other techniques to prevent unauthorized use of the media device 104. For example, the security manager 310 may be configured to require a predetermined encryption for administrative access to the communication module 108. The security manager 310 may work in conjunction with the authentication manager 308 to manage authentication tokens granted to other media devices 104. The security manager 310 may permit different access levels. These different access levels permit connectivity and operation with different restrictions.

In one implementation, the access levels may include levels such as "family," "friend," "first party devices," and "guest." The family level allows connections only from another media device 104 which is registered or otherwise associated with a common account. The friend level allows access to a specifically "trusted" media device 104. The first party device level indicates that the media device 104 shares a common manufacturer, distributor, or other attributes. The guest level is similar to friend level access, but has a limited duration in time. For example, the media device 104 may be considered a friend device when on the same LAN 110. Particular service modules 218 may define the access levels they will operate with.

The service router 312 is configured to process incoming connections. The service router 312 may route the connection to the authentication manager 308 for processing. Once authenticated and authorized, the service router 312 may direct the traffic to the appropriate service module 218.

The connection manager 314 manages the active connections in the media device 104. The user interface module 214 may be configured to present to the user 102 various prompts or information, such as whether to permit a particular connection, whether to seek out a particular connection, and so forth.

In some implementations the communication module 108 may utilize a communication protocol such as Thrift as available through the Apache Software Foundation. Thrift provides an interface definition language and compiler which is configured to compile an interface into code which is configured to work with remote procedure calls. Thrift can be used to generate client-side and server-side transport modules 302 and other modules.

FIG. 4 illustrates a schematic 400 of the route map 228 which may be used by the communication module 108 to establish communications between the media devices 104 of the infrastructure. The route maps 228 provide information about services which are available on other media devices 104, and how the transport modules 302 may route traffic to access those services. The route map 228 is depicted here as a table, however it is understood that this information may be expressed using other data structures. The route map 228 may be based at least in part on information obtained from one or more of the device objects 232.

A device identifier 402 may comprise a universally unique identifier ("UUID") associated with the particular media device 104. A device type 404 may be included which contains information about whether the media device 104 or the services available from that media device 104 is acting as a source for content, a sink for content, or both. Information about services supported 406 by particular media devices 104 may be included in the route map 228. For example, a particular media device 104 may provide for audio output, video output, presentation of still images, haptic input/output, and so forth. Addresses 408 may be stored which allow the transport modules 302 to contact the associated service modules 218. These addresses 408 may include media access control addresses, Internet Protocol addresses, Bluetooth addresses, and so forth. The route map 228 may also specify designated transport modules 410 associated with particular services. The route map 228 may include other information including a "friendly name" associated with a particular media device 104. For example, the friendly name may be "Earl's TV" associated with the television media device 104(6).

In some implementations the route map 228 or a portion thereof may be exchanged or relayed between different media devices 104. For example, the media device 104(4) depicted here has transport modules for IP and Bluetooth®, while the media device 104(5) is depicted with only a Bluetooth® transport. The media device 104(4) may relay the route map 228 to the media device 104(5), such that the media device 104(5) is able to see services which are available using transport modules otherwise unavailable to the media device 104(5). In some implementations the media devices 104 may also relay data. For example, the media 104(4) may relay data between the media device 104(1) and the media device 104(4).

Illustrative Scenarios and Processes

FIG. 5 illustrates a scenario 500 of discovering and connecting media devices using the multiple media device infrastructure supported by the described system 100. At 502, one or more media devices 104 acquire data descriptive of one or more other available media devices 104 which are available for communication. For example, media device 104(1) may acquire data from media devices 104(2)-(D). This data may include capabilities, services available, current state, and so forth of the media devices 104. For example, the data may indicate that the television media device 104(6) is currently presenting video while the digital video recorder ("DVR") media device 104(4) is currently recording a cable television show.

As described above, the data may be acquired using the communication module 108 and the associated device explorers 306. For example, information may be acquired using SSDP 306(1) or Avahi 306(4) device explorers. The media devices 104 may be deemed available when they are responsive to requests made using the LANs 110. In some implementations services and devices may be accessible using the WAN 112. For example, a media device 104 at a remote location may be accessible using the WAN 112. In other implementations networking devices such as a router, firewall, and so forth which bridge the LAN 110 to the WAN 112 may be configured to announce services which are available on the server 114. To the media devices 104 on the LAN 110, these services may appear to be local.

As described above, the acquisition of data may occur without intervention by the user 102. For example, the communication module 108 may work unobtrusively as a background process executing on the media device 104 to gather the information. As also described above, this acquisition of information may be active or passive.

Block 504 builds the route map 228. As described above with respect to FIG. 4, the route map 228 is descriptive of services available from the one or more media devices 104(1)-(D) and transport details on how to access those services. The route map 228 may be built using information obtained from device objects 232.

Block 506 establishes a connection with the one or more available media devices 104. As described above, the establishment of the connection may include authenticating the media device 104, authenticating the user 102, implementing security protocols such as encryption, and so forth. This connection is established using the one or more transport modules 302. The service modules 218 exchanging information may not be aware of the actual transport 302 being used, as the communication module 108 is configured to maintain an abstraction of these details. As illustrated here, using the various transport modules 302 and the LANs 110, different services may be provided using many protocols and standards, such as Wi-Fi Direct®, Bluetooth®, ZigBee®, Internet Protocol, and so forth.

As described above, establishment of the connection with the one or more available media devices 104 may include authenticating the one or more available media devices 104. This authentication may be performed at least in part by the authentication module 308.

As also described above, the establishment of the connection with the one or more available media devices 104 may include configuring encryption between the computerized system and the one or more available media devices 104. The encryption may be implemented at least in part by the security manager 310.

The connection may be established with various permutations of some or no authentication or encryption. For example, some connections may be authenticated but not encrypted, while others may be encrypted but not authenticated. The authentication may involve consulting with the one or more servers 114.

Block 508 presents content 106 on the one or more connected media devices 104. As described above, the content 106 may be presented using the content direct sharing module 116, the device controller module 120, or another module. The content direct sharing module 116 sends a media stream 118 to the connected one or more media devices 104. The media stream 118 is configured for presentation and uses a corresponding service executing on the connected one or more media devices 104. Content direct sharing is discussed below with regard to FIG. 6.

The device controller module 120 is configured to send media presentation data 122 to the connected one or more media devices 104. As described above, the media presentation data 122 is configured to, when processed by the one or more media devices 104, generate the presentation request 124. The presentation of content 106 using the device controller module 120 is discussed below with regard to FIG. 7.

In other implementations block 508 may perform operations other than presentation. For example, the media device 104(1) may send data to a media device 104(4) which stores, processes, or otherwise manipulates the data.

Figure 6:
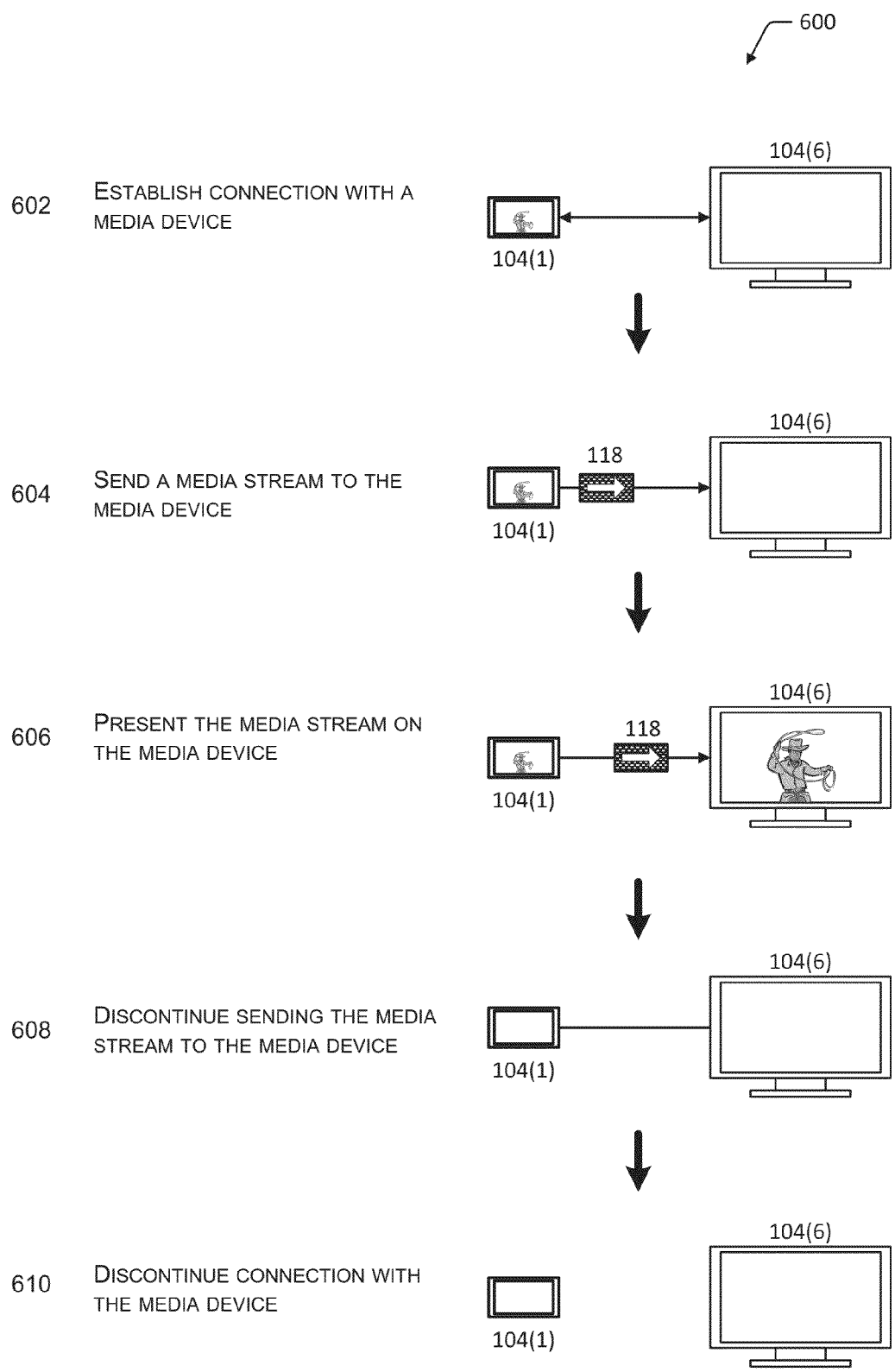
FIG. 6 illustrates a scenario of providing content direct sharing between devices in the system.

FIG. 6 illustrates a scenario 600 of providing content direct sharing between media devices 104 in the system 100. As described above, the content direct sharing modules 116 on a sending media device 104 may send a media stream 118 to a corresponding module on a receiving media device 104. This screencast allows for images, video, audio, and other multimedia data to be actively shared between media devices 104.

At 602, a connection is established between a sending media device 104 and one or more receiving media devices 104. This connection may be facilitated and maintained by the communication module 108. For example, the communication module 108 on the media device 104(1) may receive a command from the user 102 via the user interface module 214 to present the content 106 on the television media device 104(6).

At 604, the media stream 118 is sent to the one or more receiving media devices 104. As shown in this example, the tablet media device 104(1) sends the media stream 118 using the Wi-Fi™ direct transport to the television media device 104(6), using the connection established by the communication module 108 on each of the respective media devices 104.

In one implementation the stream may be provided as the real-time protocol ("RIP") as promulgated by the Audio-Video Transport Working Group of the Internet Engineering Task Force ("IETF") and currently embodied in RFC 3550. Real-Time Stream Protocol ("RTSP") may be used to exchange control information such as a "pause" command to temporarily halt presentation. Other protocols and formats may be used such as High-bandwidth Digital Content Protection ("HDCP") as promulgated by Intel® Corporation, the Motion Picture Experts Group transport stream ("MPEG-TS"), and so forth.

At 606 the receiving media device 104 presents the media stream 118. Continuing the example, the communication module 108 of the television media device 104(6) receives the media stream where the service router 312 directs the media stream 118 to the appropriate service module 218 for processing and rendering to a display. In the implementation depicted, the same content is shown mirrored on both displays of the media device 104(1) and 104(6). However, in some implementations, different information may be presented on the different media devices 104. For example, the media device 104(1) may provide the media stream 118 to the media device 104(6) as shown here, while presenting a different piece of content 106, user interface, internet browser, and so forth.

At 608, the sending media device 104 discontinues sending the media stream 118. For example, the communication module 108 on the media device 104(1) may receive a command from the user 102 via the user interface module 214 to stop presentation altogether, discontinue the content direct sharing, or both.

At 610 the connection between the sending media device 104 and the receiving media device 104 may be discontinued. For example, the communication module 108 on the tablet media device 104(1) may drop the Wi-Fi™ direct connection now that the presentation has been discontinued.

The content direct sharing allows presentation of the content 106 on the media devices 104 which may be unable to present the content 106 directly. For example, the television media device 104(6) may lack the services to directly contact the server 114 of the content provider and present the content, but the tablet media device 104(1) may.

In another implementation, the content direct sharing may be used to present content 106 on other media devices 104 without transferring the entire content 106 or relinquishing control over the content 106. For example, a presenter at a technical conference may use the content direct sharing to present video on an auditorium's projector display without having to provide a copy of the video to the conference sponsors.

Figure 7:
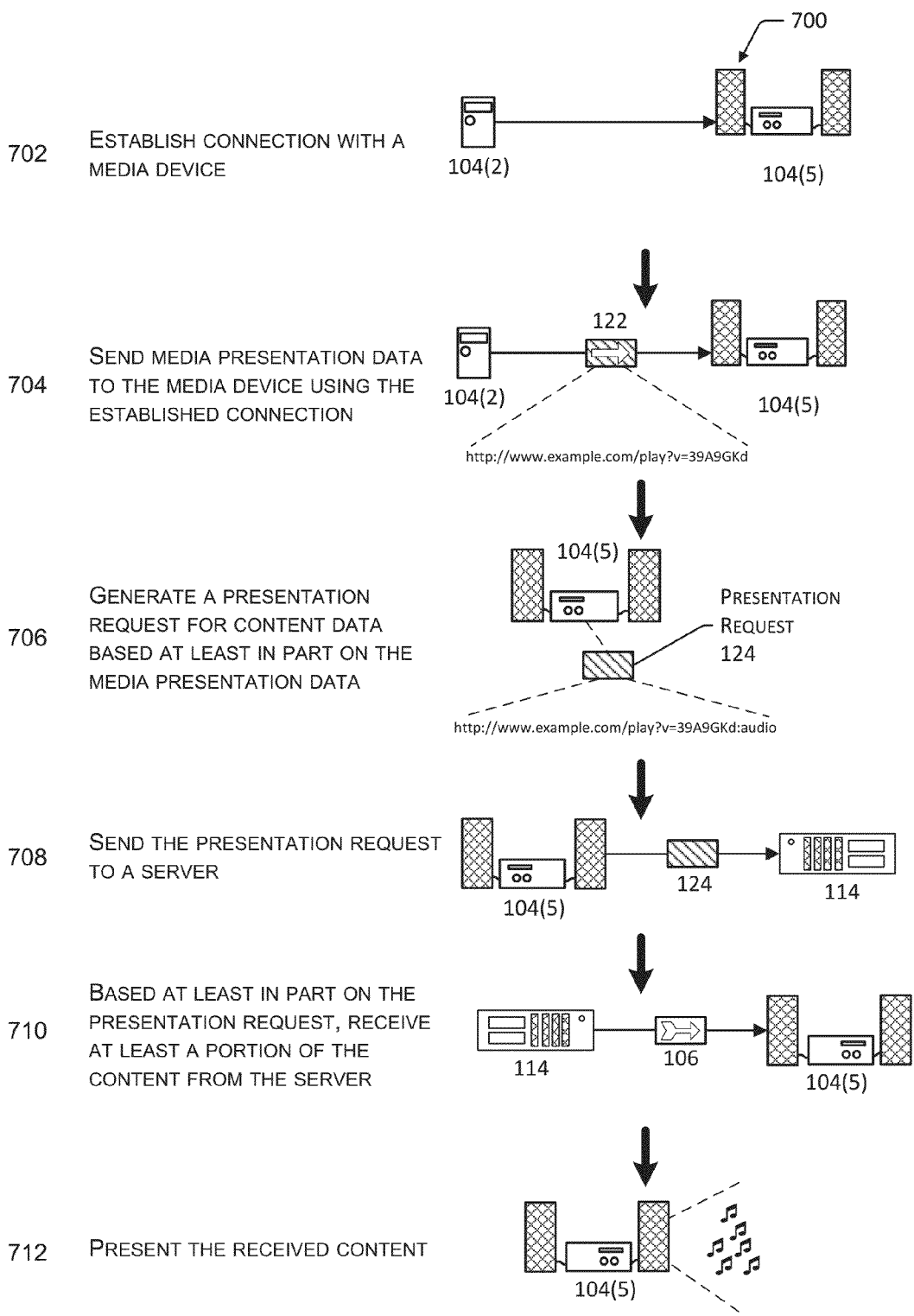
FIG. 7 illustrates a scenario of initiating presentation of content on another device in the system.

FIG. 7 illustrates a scenario 700 of initiating presentation of content on another device in the system. As described above, device controller modules 120 may be used to pass media presentation data 122 from one media device 104 to another. The media device 104 receiving the media presentation data 122 may then initiate presentation of the content 106.

At 702, a connection is established between a first media device 104 and one or more other media devices 104. This connection may be facilitated and maintained by the communication module 108. For example, the communication module 108 on the media device 104(2) may receive a command from the user 102 via the user interface module 214 to present the content 106 on the AVR media device 104(5).

At 704, the first media device 104 sends media presentation data 122 to the one or more other media devices 104 using the established connection. As described above, the media presentation data 122 provides information indicative of one or more pieces of content 106 to be presented, such as a URL, URI, content identifier, and so forth. Continuing the example, the media device 104(2) sends the media presentation data 122 for the URL "http://www.example.com/play?v=39A9GKd" to the media device 104(5).

At 706, the one or more media devices 104 receiving the media presentation data 122 may process the data 122 and generate presentation requests 124. The presentation request 124 may be based at least in part on the media presentation data 122. The presentation request 124 comprises data indicative of a particular piece of content 106 and may indicate details about the presentation requested, such as specifying a resolution, audio only, and so forth. For example, as illustrated here the presentation request 124 includes tags indicating the content 106 is to be provided as audio-only.

The presentation request 124 may be configured to be processed by a particular service executing on a server 114. For example, the presentation request 124 for content 106 from content provider A may have a different format than that used for content provider B, even when requesting otherwise identical content 106.

At 708, the presentation request 124 may be sent to a content provider, such as executing on the server 114. At 710, based at least in part on the presentation request 124, at least a portion of the content 106 is received from the server 114. For example, the audio only version of the content may be received from the server 114.

At 712, the media device 104 presents the received content 106. Continuing the example, the receive content 106 may be rendered as audio through the speakers of the AVR media device 104(5).

Figure 8:
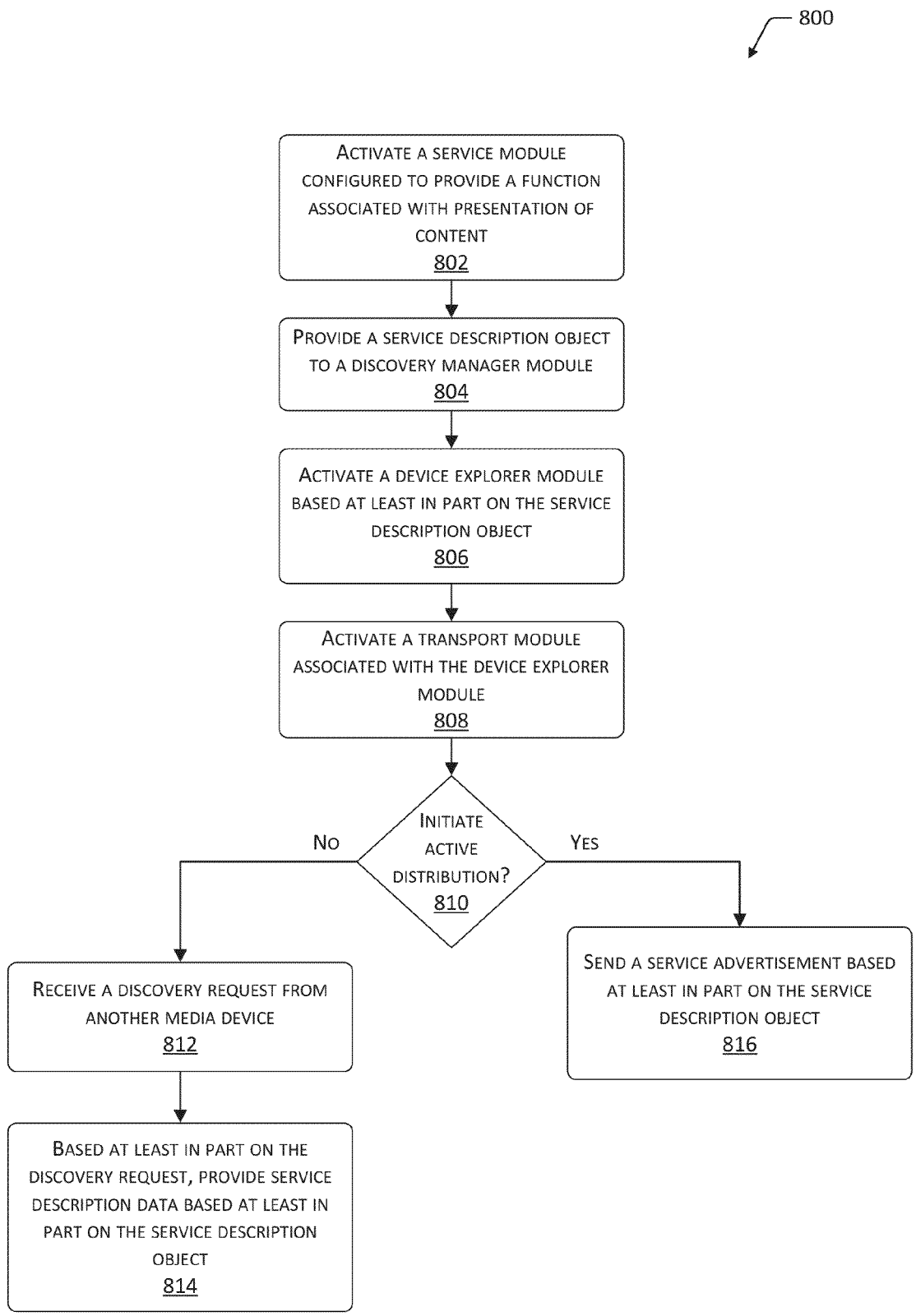
FIG. 8 is a flow diagram of a process of registering a service with a media device in the system.

FIG. 8 is a flow diagram 800 of a process of registering a service with the media device 104 in the system 100. In some implementations this process may be provided at least in part by the communication module 108.

Block 802 activates a service module 218 configured to interact with content 106. This interaction includes providing one or more functions associated with presentation of the content on the media device 104. As described above, the service module 218 is configured to interact with the content 106 by receiving and processing the content 106 for presentation, generating a stream of content for presentation, or both. For example, the service module 218 may be configured to present streamed video content 106 on a display.

Block 804 provides, to a discovery manager 304, a service description object 230 indicative of the activated service module 218. As described above, the service description object 230 provides information such as service identifiers, access information, encryption information, and so forth, associated with a particular service as provided by a service module 218.

Based at least in part on the service description object 230, block 806 activates one or more device explorers 306. The device explorer module 306 is configured to send or receive device object data to or from the media device 104. For example, the service description object 230 may include information indicating the active service uses Bluetooth®, resulting in the use of the Bluetooth® 306(3) device explorer.

Block 808 activates one or more transport modules 302 associated with the one or more device explorers 306. As described above, the transport modules 302 comprise devices and protocols configured to establish and maintain a communication channel between media devices 104 and other devices. With the channel established, data associated with the service module 218 may be exchanged with another media device 104 using the transport module 302. For example, the server socket 302(4) transport module may be used to exchange information over an IP-based network.

As described above, the distribution of information about services available on the media device 104 may be passively or actively distributed. Block 810 determines whether active distribution has been selected or otherwise initiated. When passive distribution has been selected, the process proceeds to block 812.

Block 812 receives a discovery request from another media device 104. For example, the communication module 108 of the media device 104(1) may receive a discovery request from the media device 104(2).

Based at least in part on the discovery request, block 814 provides service description data which may be based at least in part on the service description object 230. In this way, the passive distribution mode waits for a request before providing information about services available on the media device 104. Continuing the example, the media device 104(1), responsive to the discovery request, provides information about the service modules 218 available on the media device 104(1).

Returning to block 810, when active distribution is initiated, the process proceeds to block 816. Block 816 sends a service advertisement using the transport 302. The service advertisement may be based at least in part on the service description object 230 and includes information about the functions provided by the service module 218. The information may include service identifiers, access information, encryption information, address information, and so forth. In some implementations, the service advertisement comprises a broadcast on the one or more LANs 110 coupled to the transport 302 of the communication module 108.

Figure 9:
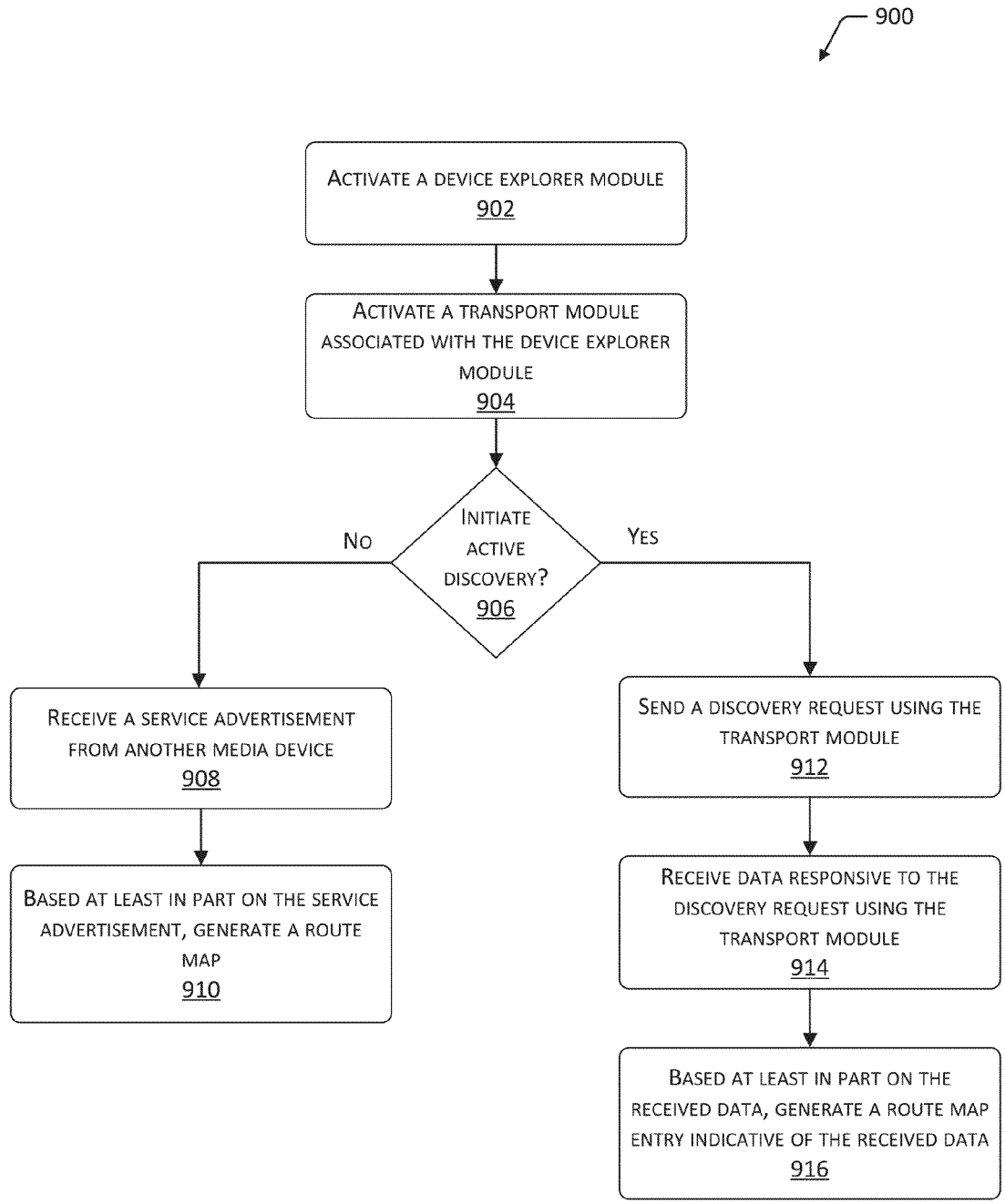
FIG. 9 is a flow diagram of a process of discovering services available from media devices in the system.

FIG. 9 is a flow diagram 900 of a process of discovering services available from media devices 104 in the system. As described above, the media device 104 may seek out service modules 218 which are available on other media devices 104.

Block 902 activates one or more device explorers 306. As described above, the device explorers 306 are configured to determine service modules 218 available on the media devices 104 in the system 100.

Block 904 activates one or more transport modules 302 associated with the one or more active device explorer(s) 306. For example, where the Wi-Fi™ Display 306(2) and the Bluetooth® 306(3) device explorers are active, the secure Wi-Fi™ Display server 302(1), the non-secure Wi-Fi™ Display server 302(2), the Bluetooth® secure 302(5), and the non-secure 302(6) transports may be activated.

Block 906 determines whether active discovery has been selected or otherwise initiated. When passive discovery has been selected, the process proceeds to block 908.

Block 908 receives a service advertisement from a media device 104. This service advertisement may be a packet broadcast across the LAN 110, or data specifically addressed to the media device 104.

Based at least in part on the service advertisement, block 910 generates the route map 228. As described above, the route map 228 comprises address information associated with communication by the media device 104 using the transport module 302. The route map 228 may then be used by the communication module 108 to provide access to the services on the other media devices 104 in the system 100.

Returning to block 906, when active discovery has been selected, the process proceeds to 912. Block 912 sends a discovery request using the transport 302. For example, a Bluetooth® discovery request may be sent using the Bluetooth® 302(6) transport.

Block 914 receives data responsive to the discovery request using the transport. For example, the transport 306 may receive service description data from the other media device 104.

Based at least in part on the received data, block 916 generates the route map 228. As described above, the route map 228 comprises address information associated with communication with the media device 104 using the transport module 302.

Figure 10:
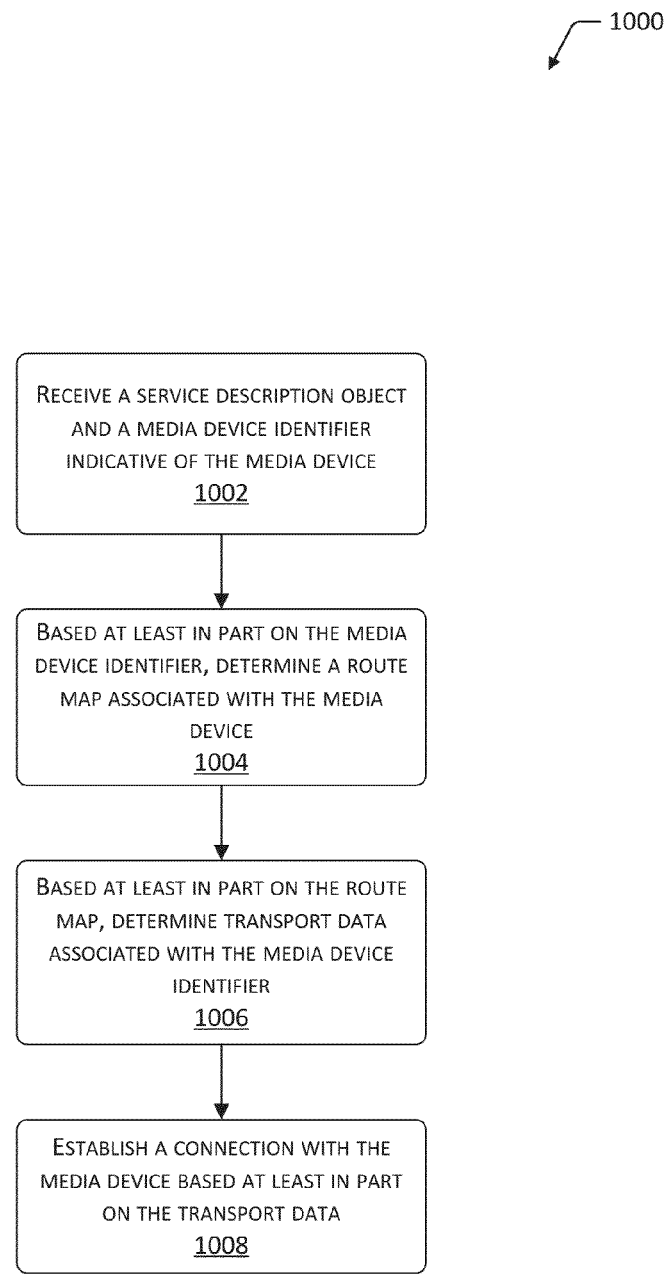
FIG. 10 is a flow diagram of a process of establishing a connection between media devices in the system.

FIG. 10 is a flow diagram 1000 of a process of establishing a connection between media devices 104 in the system 100. This process may be implemented by the communication module 108. Once a connection is established, data may be exchanged between the two or more media devices 104. For example, the connection may be used to transfer the media stream 118, media presentation data 122, or other data.

Block 1002 receives a service description object 230 and a media device identifier indicative of a media device 104. The media device identifier may comprise a device identifier 402. The service description object 230 may provide information about what the connection will be used for, while the device identifier 402 indicates which media device 104 to connect to. As described above, the service description object 230 may include one or more of data identifying a service configured to interact with content 106, access credentials associated with utilizing the service, or encryption associated with communicating with the service.

Block 1004 determines the route map 228 associated with the media device 104. For example, the route map 228 as illustrated in FIG. 4 may be associated with the media device 104 and may be retrieved from the memory 210. As described above, the route map 228 may include one or more of a unique device identifier, data indicative of one or more services supported by the media device, a specified transport, or a network address.

Based at least in part on the route map 228, block 1006 determines transport data associated with the media device identifier. As described above, the transport data may include information indicative of routing information associated with a particular media device 104. In some implementations, the device identifier 402 may be used as a key to retrieve the address(es) 408, designated transport module 410, and so forth, which is associated with the particular transport 306.

Block 1008 establishes a connection with the media device 104 based at least in part on the transport data. For example, the IP address for the media device 104(4) may be used along with the server socket (secure) 302(3) transport to establish communication between the media devices 104, or other media devices.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method for utilizing devices of a computerized system to present content, the computer-implemented method comprising:
    activating a service module configured to provide a function associated with presentation of the content on a media device;
    providing, to a discovery manager module, a service description object indicative of the activated service module;
    based at least in part on the service description object, activating a device explorer module configured to send or receive device object data from the media device;
    activating a transport module associated with the device explorer module;
    generating a route map based at least in part on data acquired by the device explorer module;
    based at least in part on the route map, determining transport data indicative of routing information associated with the media device;
    establishing a connection with the media device based at least in part on the transport data; and
    sending, via the established connection, information associated with the functions provided by the service module to present the content on the media device.

2. The method of claim 1, wherein the information associated with the presentation of the content comprises a media stream of the content sent to the media device.

3. The method of claim 1, wherein the information associated with the presentation of the content comprises media presentation data indicative of a storage location from which the media device is configured to retrieve content for presentation.

4. The method of claim 1, further comprising authenticating the media device by querying a server for information associated with the media device.

5. A method comprising:
    activating a service module configured to provide a function associated with presentation of content;
    providing, to a discovery manager module, a service description object indicative of the activated service module;
    based at least in part on the service description object, activating a device explorer module;
    activating a transport module associated with the device explorer module, wherein the transport module is configured to establish a communication channel with a media device; and
    sending data associated with the presentation of the content from the service module to the media device using the communication channel.

6. The method of claim 5, wherein the service description object comprises one or more of:
    data identifying a service configured to interact with content,
    access credentials associated with utilizing the service, or
    data indicative of encryption associated with communicating with the service.

7. The method of claim 5, wherein the function associated with presentation of the content comprises generating a media stream of content for presentation, and further wherein the data associated with the presentation of the content comprises the media stream.

8. The method of claim 5, further comprising:
    receiving a discovery request from the media device; and
    based at least in part on the discovery request, providing service description data indicative of: one or more of the activated service modules, and the functions associated with presentation of the content from each.

9. The method of claim 5, further comprising:
    sending a service advertisement using the transport module, wherein the service advertisement comprises one or more of: a service identifier, access information, or encryption information.

10. The method of claim 9, the sending the service advertisement comprising broadcasting the service advertisement on a network coupled to the transport module.

11. The method of claim 5, further comprising:
    receiving a service advertisement from the media device; and
    based at least in part on the service advertisement, generating a route map comprising media access control address information associated with the media device.

12. The method of claim 5, further comprising:
    sending a discovery request using the transport module;
    receiving data responsive to the discovery request using the transport module; and based at least in part on the received data, generating a route map comprising address information associated with the media device.

13. A system, comprising:
    at least one memory storing computer-executable instructions; and
    at least one processor configured to access the at least one memory, and execute the computer-executable instructions to:
        receive a service description object comprising information indicative of one or more active service modules on a media device and a media device identifier indicative of the media device;
        based at least in part on the media device identifier, determine a route map associated with the media device;

based at least in part on the route map, determine transport data associated with the media device identifier; and establish a connection with the media device based at least in part on the transport data.

14. The system of claim 13, wherein the service description object comprises one or more of:
data identifying a service configured to process content,
access credentials associated with utilizing the service, or
data indicative of encryption associated with communication to the service.

15. The system of claim 13, the route map comprising one or more of:
a device identifier,
data indicative of one or more services supported by the media device,
data indicative of a specified transport module, or
a communication address.

16. A method comprising:
providing a function associated with presentation of content using a service module;
providing a first service description object indicative of the service module;
determining device object data corresponding to the service description object and a first media device;
activating, based at least in part on the device object data and the first service description object, a transport module to establish a communication channel with the first media device; and
sending data associated with the presentation of the content from the service module to the first media device using the communication channel.

17. The method of claim 16, wherein the first service description object comprises access credentials associated with utilizing a service to interact with the content and data indicative of encryption information associated with communication to the service.

18. The method of claim 16, further comprising:
broadcasting a service advertisement to the first media device, wherein the service advertisement comprises one or more of: a service identifier, access information, or encryption information.

19. The method of claim 16, further comprising:
sending a discovery request;
receiving data responsive to the discovery request; and
based at least in part on the received data, generating a route map comprising address information associated with the first media device.

20. The method of claim 16, further comprising:
receiving a second service description object comprising information indicative of one or more service modules active on a second media device and a media device identifier indicative of the second media device;
determining, based at least in part on the media device identifier, a route map associated with the second media device;
determining transport data associated with the media device identifier; and
establishing a connection with the second media device using the transport data.

* * * * *